Dec. 3, 1963
J. A. RONNING
3,112,593
ROTARY LAWN TOOL
Filed Jan. 30, 1961
5 Sheets-Sheet 3
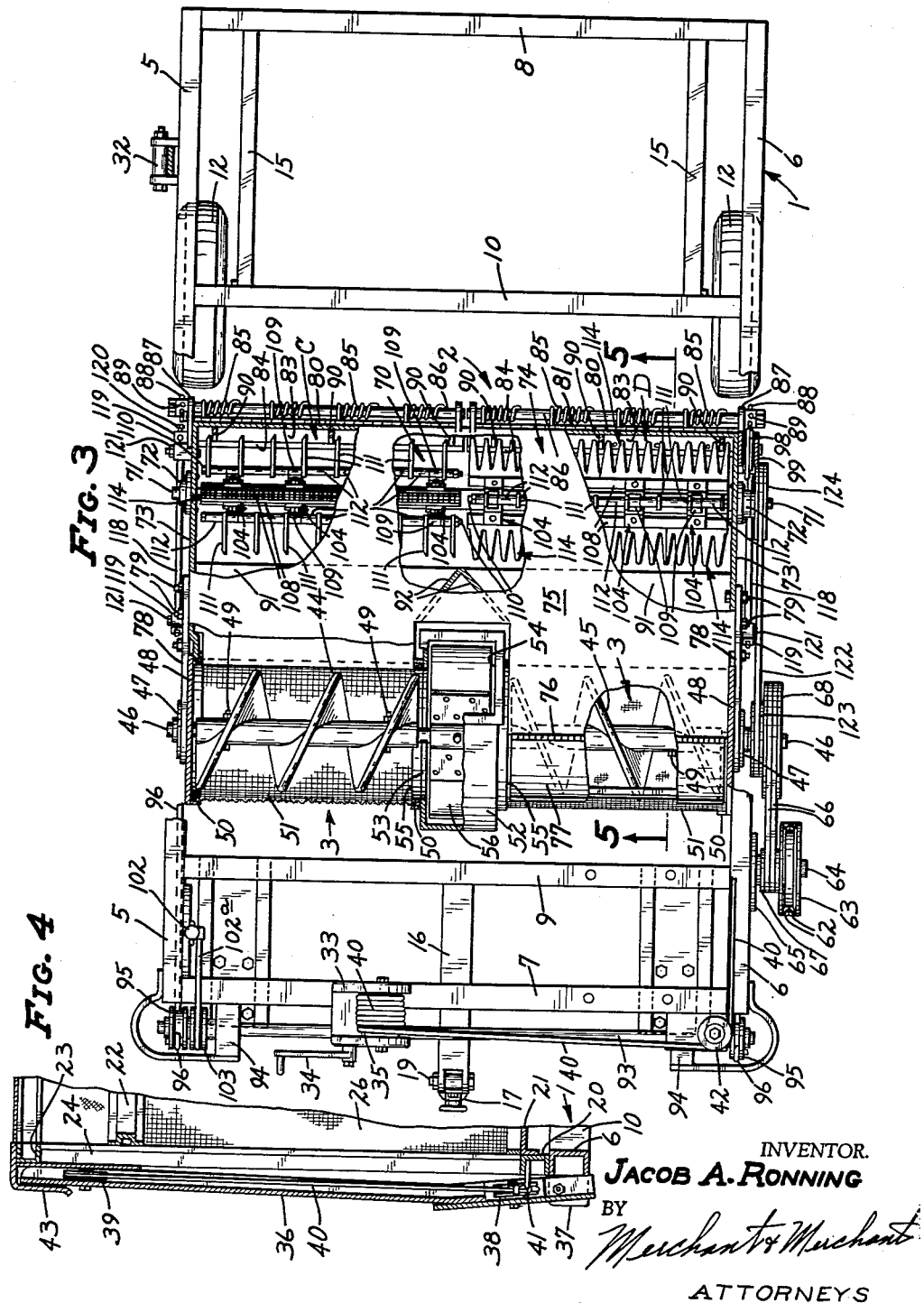
INVENTOR.
JACOB A. RONNING
BY
Merchant & Merchant
ATTORNEYS

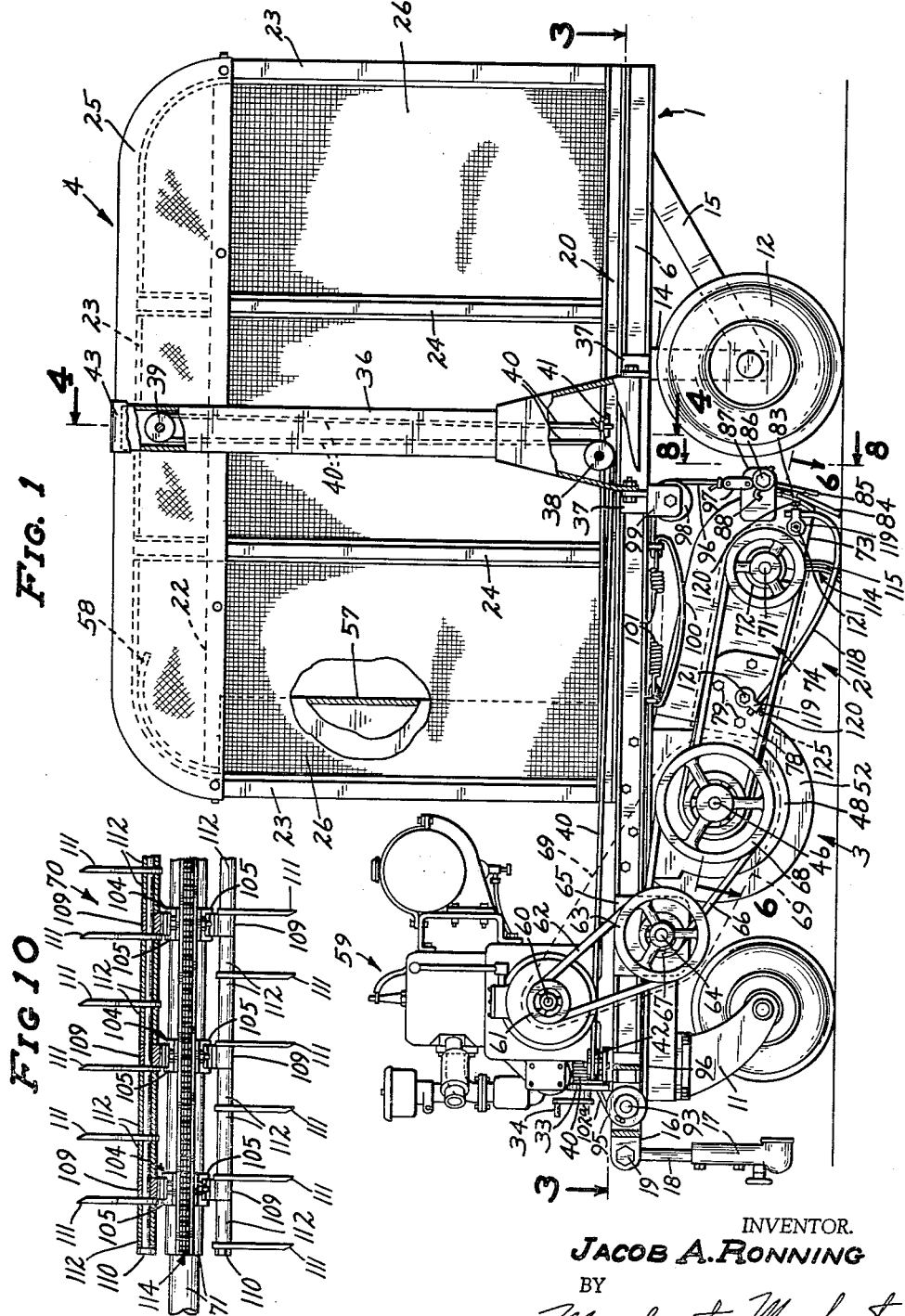
Dec. 3, 1963     J. A. RONNING     3,112,593
ROTARY LAWN TOOL
Filed Jan. 30, 1961     5 Sheets-Sheet 1
INVENTOR.
JACOB A. RONNING
BY
Merchant & Merchant
ATTORNEYS

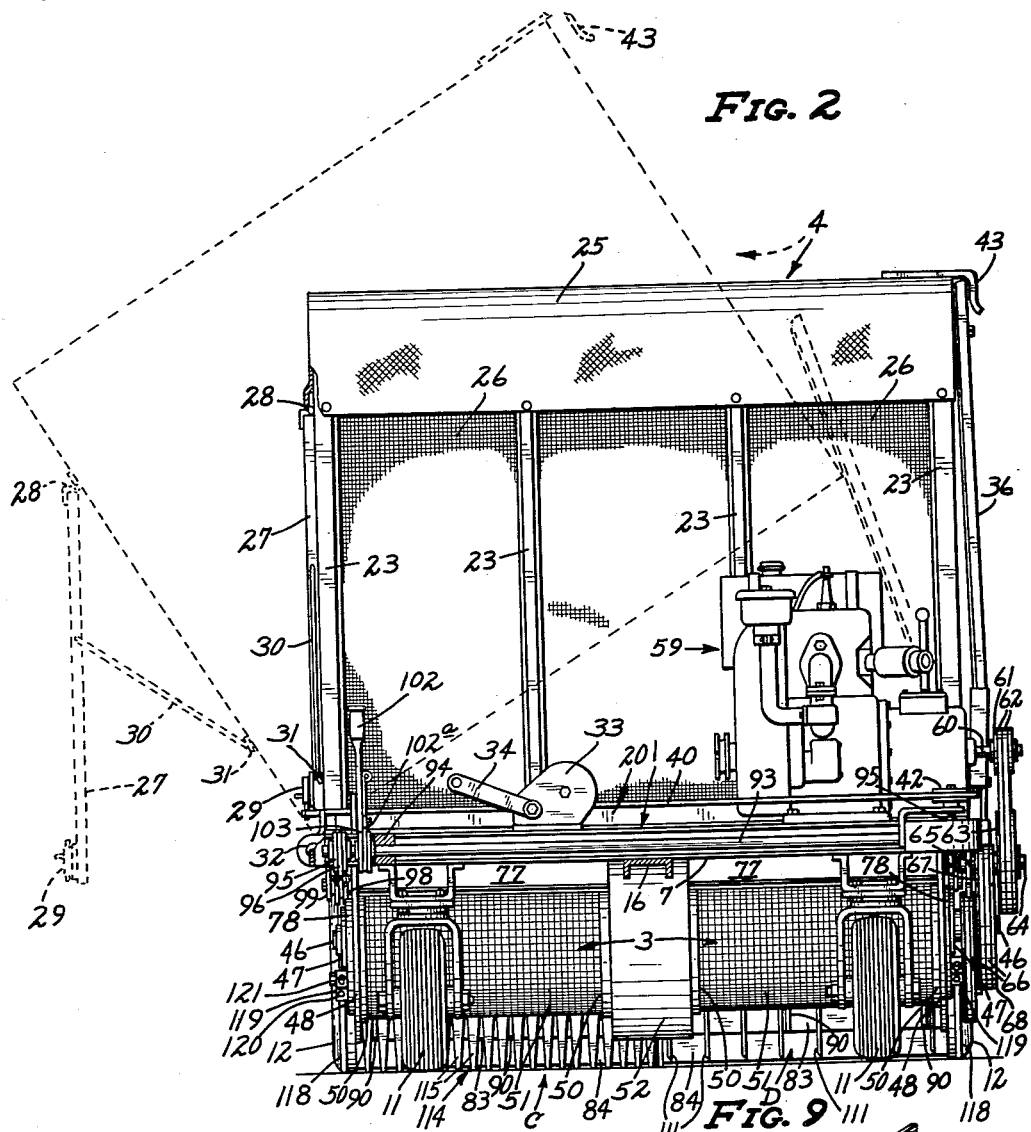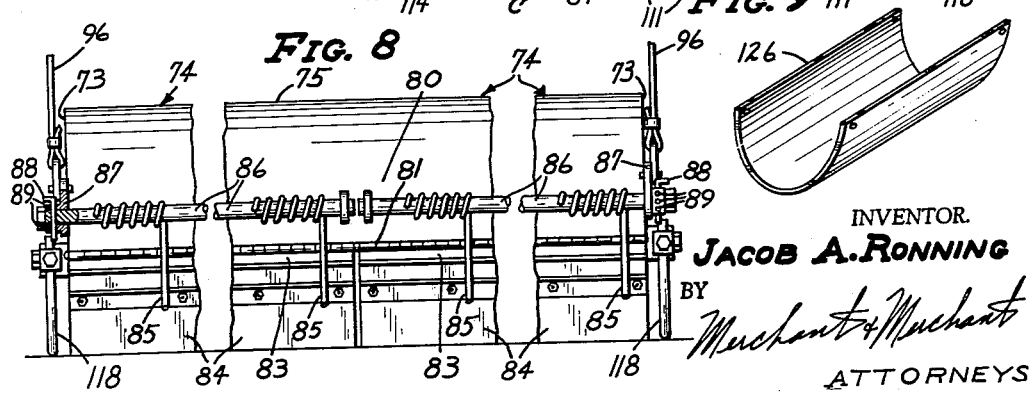

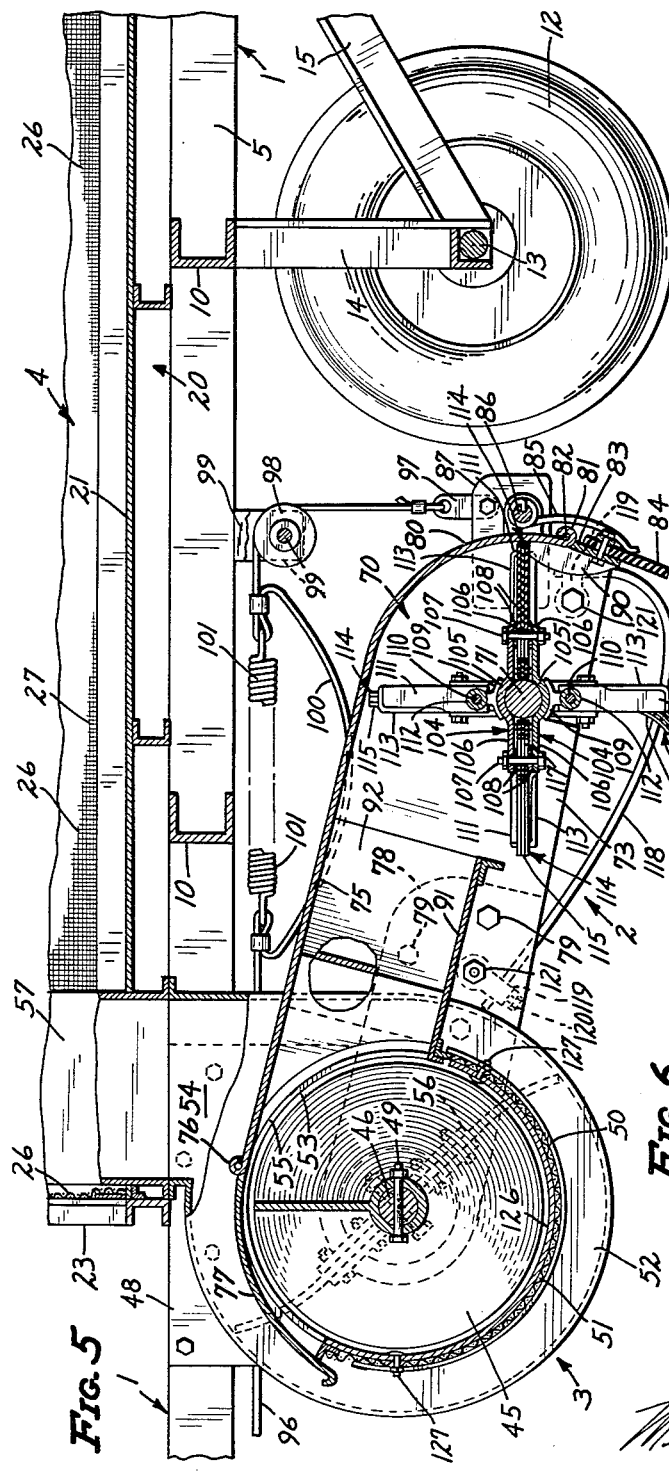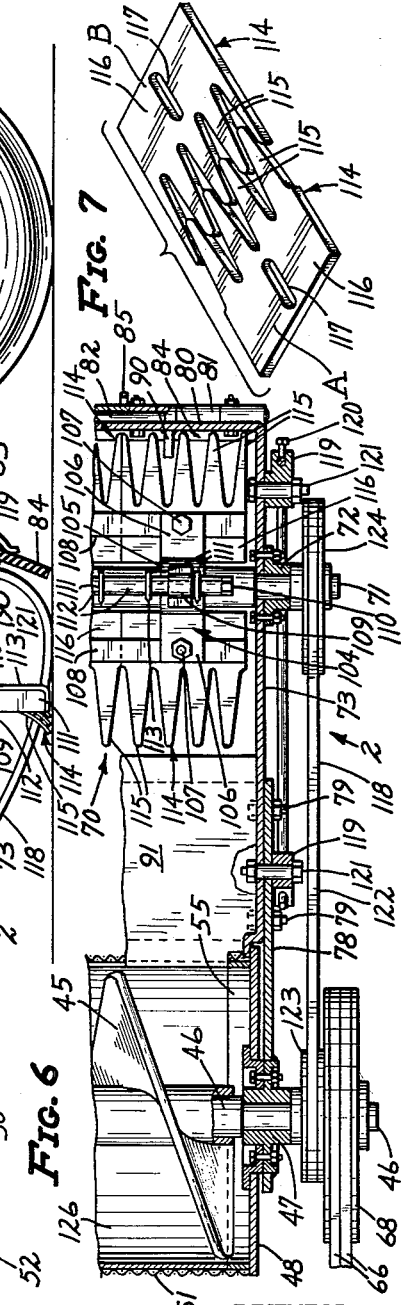

Dec. 3, 1963  J. A. RONNING  3,112,593
ROTARY LAWN TOOL
Filed Jan. 30, 1961  5 Sheets-Sheet 5
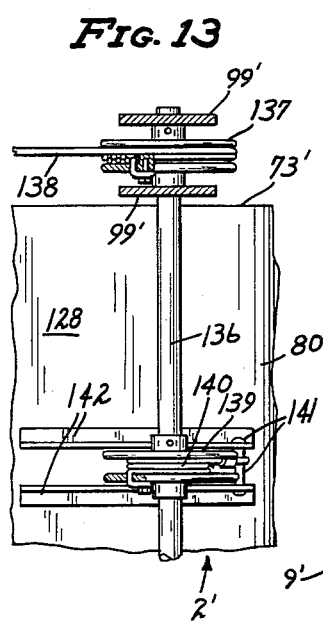
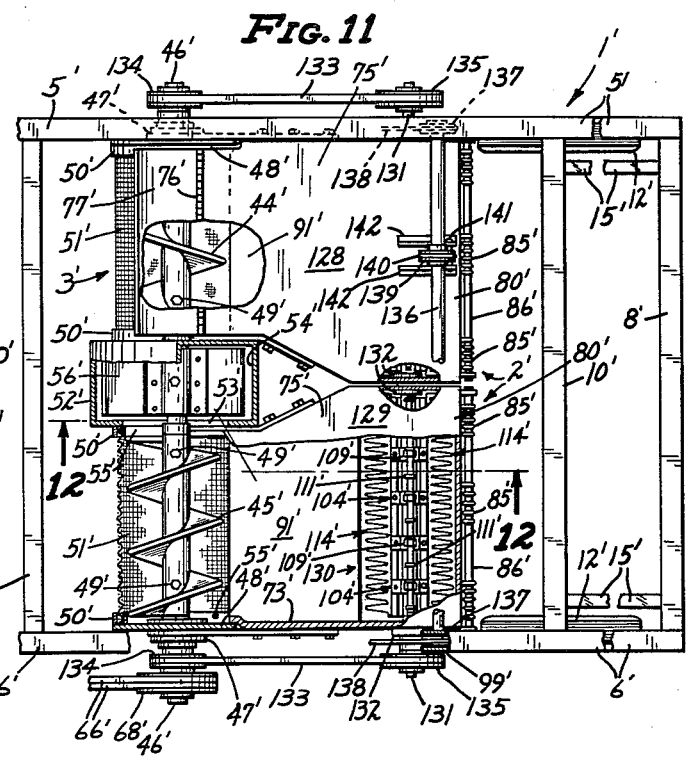
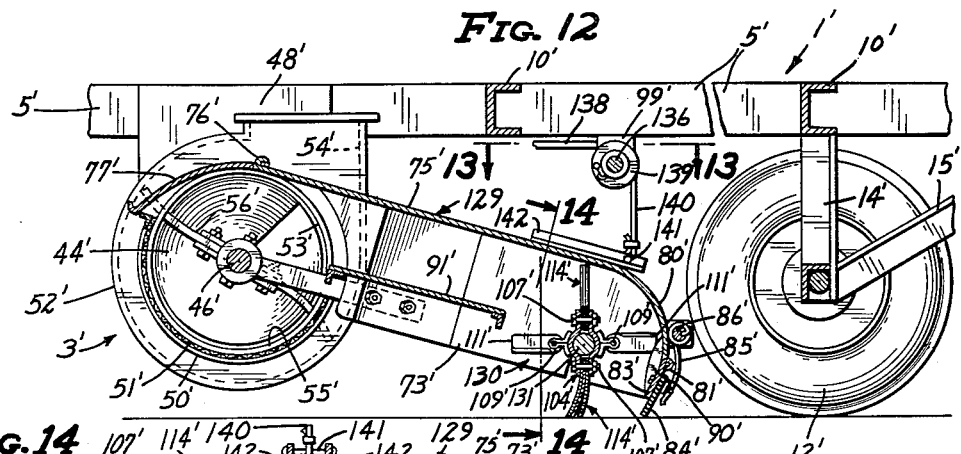
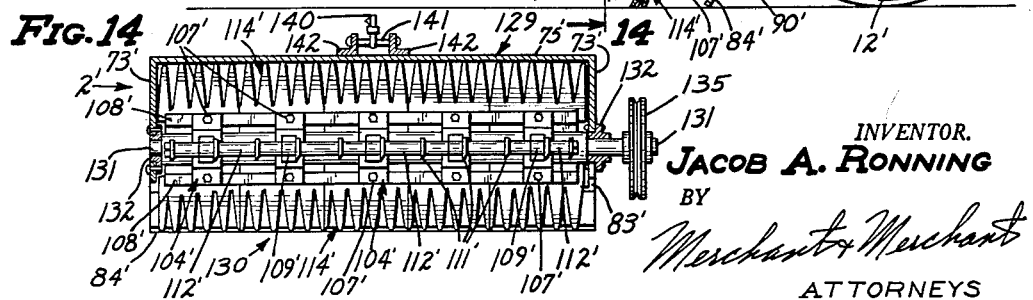
INVENTOR.
JACOB A. RONNING
BY
Merchant & Merchant
ATTORNEYS

United States Patent Office 3,112,593
Patented Dec. 3, 1963

3,112,593
ROTARY LAWN TOOL
Jacob A. Ronning, 949 Central Ave. NE.,
Minneapolis, Minn.
Filed Jan. 30, 1961, Ser. No. 85,826
5 Claims. (Cl. 56—24)

My invention relates generally to lawn tools, and more particularly to such tools as are employed in the raking of grass and gathering up of foreign material, such as grass clippings, leaves, stones and the like.

An important object of the invention is the provision of a lawn tool having rotary raking and sweeping means including radial cutter blades adapted to pass between upstanding blades of live grass to rake the grass and to chop generally horizontally disposed portions of thatch-forming dead grass clippings, leaves and the like, and flexible radial whiplashes for sweeping the loosened and chopped material from the surface of the lawn.

Another object of my invention is the provision of raking and sweeping means including a rotor having radial whiplashes of flexible material, and mounting means for said whiplashes whereby the whiplashes may be radially adjusted to compensate for wear.

Another object of my invention is the provision of raking and sweeping means including a rotor having axially extending rows of radial whiplashes of flexible material, and axially extending rows of radial cutter blades between adjacent rows of whiplashes, whereby a lawn being traversed by the tool is alternately raked and swept as each row of cutter blades and whiplashes engages the grass.

Still another object of my invention is the provision of a mobile lawn tool of the type set forth having novel means for conveying material gathered from the lawn by the raking and sweeping means to a storage container.

Another object of my invention is the provision of novel means for mounting the raking and sweeping means whereby the same can be quickly and easily raised and lowered relative to the ground traversed.

Another object of my invention is the provision of raking and sweeping means including a rotor having radial whiplashes and radial cutter blades, and of mounting means for said whiplashes and cutter blades whereby said whiplashes and blades may be quickly and easily removed and as quickly and easily replaced, when unduly worn.

The above, and still further highly important objects and advantages of my invention will become apparent from the following detailed specification, appended claims, and attached drawings.

Refering to the drawings, which illustrate the invention, and in which like reference characters indicate like parts throughout the several views:

FIG. 1 is a view in side elevation of a lawn tool made in accordance with my invention, some parts being broken away and some parts being shown in section;

FIG. 2 is a view in front elevation, some parts being broken away and some parts shown in section;

FIG. 3 is a view partly in plan and partly in horizontal section, taken on the line 3—3 of FIG. 1, some parts being broken away and some parts removed;

FIG. 4 is an enlarged fragmentary detail in vertical section, taken on the line 4—4 of FIG. 1;

FIG. 5 is an enlarged fragmentary section taken substantially on the line 5—5 of FIG. 3;

FIG. 6 is an enlarged fragmentary generally horizontal section taken on the line 6—6 of FIG. 1;

FIG. 7 is a composite view in perspective of a pair of whiplash elements of my invention;

FIG. 8 is a fragmentary view in rear elevation as seen from the line 8—8 of FIG. 1, some parts being broken away and some parts being shown in section;

FIG. 9 is a view in perspective, on a reduced scale, of a conveyor liner of my invention;

FIG. 10 is a fragmentary view in side elevation of the raking and sweeping rotor of my invention, some parts being broken away and some parts being shown in section;

FIG. 11 is a fragmentary view corresponding to FIG. 3, on a reduced scale, but showing a modified form of the invention;

FIG. 12 is an enlarged fragmentary section taken substantially on the line 12—12 of FIG. 11;

FIG. 13 is an enlarged fragmentary view partly in plan and partly in section, taken on the line 13—13 of FIG. 12; and FIG. 14 is a fragmentary section taken substantially on the line 14—14 of FIG. 12.

In the preferred embodiment of the invention illustrated in FIGS. 1–10, a generally rectangular mobile frame 1 is shown as supporting a raking and sweeping device, indicated generally at 2, power-driven conveyor mechanism indicated generally at 3, and collector means in the nature of a container 4. The frame 1 comprises a pair of laterally spaced generally parallel side rails 5 and 6 connected by front and rear cross members 7 and 8 respectively, and intermediate cross frame members 9 and 10. The frame 1 is supported at its front end by a pair of pneumatic tire-equipped caster wheels 11, and at their rear ends by a pair of pneumatic tire-equipped rear wheels 12 that are journalled on a fixed axle member 13 that is rigidly secured to the frame 1 by upright legs 14 and angle braces 15. At its front end, the frame 1 is provided with a forwardly extending drawbar 16 that is provided at its front end with a conventional hitch 17 having a shank 18 that is pivotally secured to the front end of the drawbar 16, as indicated at 19. The hitch 17 is adapted to engage the usual hitch ball, not shown, secured to the rear end of a suitable pulling vehicle, such as an automobile, truck, tractor or the like.

The storage container 4 is generally rectangular in shape, and comprises a rectangular bottom frame 20 having a solid floor 21 thereon, a rectangular upper frame member 22, inverted generally U-shaped frame members 23, and vertically disposed side frame members 24. The top of the container is preferably covered with a fabric roof or the like 25, and the front, one side, and rear wall of the container 4 are of relatively heavy screen cloth or the like 26. The opposite side of the container 4 is provided with a gate 27 that is hinged at its upper edges to the container 4, as idicated at 28, and which is releasably locked in a closed position by a conventional slide bolt 29. An elongated rod 30 pivotally secured at one end to the gate 27 has its opposite end adapted to be inserted in a suitable aperture in the container 4 adjacent one side of the gate, and is provided adjacent said opposite end with a stop flange 31. The bottom frame 20 of the container 4 normally rests upon the main frame 1, and is pivotally secured to the frame 1 at the gate-equipped side of the container 4, by hinges or the like 32, see FIGS. 2 and 3. As shown in FIG. 2, the container 4 is adapted to be pivotally moved on the hinges 32 between a normal loading position shown by full lines in FIG. 2, and a tilted unloading position shown by dotted lines in FIG. 2.

Means for tilting the container 4 to its dotted line position of FIG. 2 against gravity bias urging the container 4 toward its normal full line position of FIG. 2, comprises a conventional manually operated winch or the like 33 that is rigidly secured to the front cross member 7 of the frame 1, and which utilizes the usual crank 34 and winding drum 35. A generally vertically disposed hollow boom 36 is pivotally mounted at its lower end to angle brackets 37 rigidly secured to the side frame member or rail 6, and which has journaled therein lower and upper pulleys 38 and 39 respectively, over which is entrained a flexible cable 40. As shown in FIGS. 1 and 3, one end of the cable 40 is tied to an anchoring tongue or the like 41 welded or otherwise secured to the bottom frame 20 of the container 4, the opposite end of the cable 40 being wound on the drum 35. As shown in FIG. 1, the cable 40 extends upwardly from the anchoring tongue 41 through the boom 36, over the pulley 39, and from thence downwardly through the boom 36 to the lower pulley 38. From thence, the cable 40 extends forwardly to the front end portion of the frame 1 where it is entrained over another pulley 42 from whence it extends to the winding drum 35 of the winch 33. As shown, the pulley 42 is suitably journalled on the front end of the frame 1 for rotation on a vertical axis. When the slide lock 29 is released, and the winch 33 operated to tilt the container 4, the gate 27 opens by gravity to permit the material accumulated in the container 41 to be discharged therefrom. An angular retainer member or hook 43 secured to the top of the container 4, receives the upper end of the hollow boom 36 when the container 4 is in its normal material-receiving position, to prevent accidental outward movement of the upper end of the boom 36.

The conveyor mechanism 3 of my invention involves a screw conveyor comprising a pair of opposed conveyor sections 44 and 45 that are mounted on a horizontally disposed shaft 46 extending transversely of the frame 1 and journalled in suitable bearings 47 that are mounted in end plates or the like 48 one each bolted or otherwise rigidly secured to the side rails 5 and 6 of the frame 1. As shown in FIG. 5, the conveyor section 45 is anchored to the shaft 46, for common rotation therewith, by nut-equipped bolts 49; and as shown the conveyor screw section 44 is similarly anchored to the shaft 46. The end plates 48 are provided with axially inwardly projecting semicylindrical flanges 50 to which are rigidly secured the axially outer ends of semicylindrical perforate troughs 51 that are disposed in underlying concentric relation to respective ones of the screw conveyor sections 44 and 45. Preferably, and as shown, the troughs 51 are made from relatively heavy and rigid woven metallic screen. A blower housing 52 is provided with opposed inlet openings 53 and a tangential discharge opening 54, the inlet openings 53 being defined by circumferential flanges 55 to the bottom portions of which the inner ends of the troughs 51 are rigidly secured, whereby to support the blower housing 52. A double-bladed fan element 56 is rigidly secured to the shaft 46 within the blower housing 52, for common rotation with the shaft 46. The discharge opening 54 of the blower housing 52 is disposed to be in register with a discharge conduit 57 that extends upwardly through the floor 21 of the container 4 adjacent the front wall thereof, the conduit 57 terminating at a point in downwardly spaced relation from the top of the container 4. An arcuate guide plate shown by dotted lines in FIG. 1, and indicated by the numeral 58, directs flow of the material downwardly and to the rear of the container 4.

Rotary movement is imparted to the shaft 46 in a direction to cause the conveyor sections 44 and 45 to feed material laterally inwardly from the outer ends thereof toward the inlet openings 53 of the blower housing, and to the fan element 56 in a direction to create an upwardly flowing air stream through the conduit 57, when the container 4 is in its normal material-collecting position, by means now to be described. A conventional internal combustion engine 59 is bolted or otherwise rigidly mounted on the cross frame members 7 and 9, and is provided with an output shaft 60 on which is mounted a drive pulley 61. The pulley 61 is preferably of the double V groove type, and has entrained thereover a pair of endless flexible V-belts 62 that are also entrained over a double-grooved idler pulley 63 mounted on a jack shaft 64 that is suitably journalled in a mounting member 65 fast on the frame 1. A second pair of endless flexible V-belts 66 are entrained over a second double-grooved pulley 67 on the shaft 64, and over a driven pulley 68 fast on the adjacent end of the conveyor shaft 46. With reference particularly to FIG. 1, it will be seen that the diameter of the pulley 63 is greater than that of the drive pulley 61, the diameter of the pulley 67 being less than that of the pulley 63, and that the diameter of the pulley 68 is greater than that of the pulley 67, whereby a suitable speed reduction is obtained between that of the motor shaft 60 and the conveyor shaft 46. Conventional guard means for the various pulleys and belts is shown by dotted lines in FIG. 1, and indicated by the numeral 69.

The raking and sweeping device 2 comprises a rotor 70 including a horizontally disposed rotor shaft 71 disposed in rearwardly spaced parallel relation to the conveyor shaft 46, the shaft 71 being journalled in bearings 72 that are mounted on opposite side walls 73 of a hood 74. The hood 74 further includes a top wall 75 the forward end of which is bifurcated, extending forwardly at opposite sides of the blower housing 52, and terminating in laterally extending hinges 76, one of which is shown in FIG. 3. The hinges 76 overlie the conveyor sections 44 and 45 and hingedly support a pair of closure members 77 which curve forwardly and downwardly to closely encompass the upper portions of the conveyor sections 44 and 45. The hood 74 is mounted for generally vertical swinging movements about the axis of the conveyor shaft 46, by means of a pair of mounting plates 78 that are bolted or otherwise rigidly secured to the forward ends of the side walls 73, as indicated at 79, the mounting plates 78 being welded or otherwise rigidly secured to the bearings 47. With reference to FIG. 6, it will be seen that the bearings 47 are journalled in the end plates 48, whereby to permit said upward and downward swinging movements of the hood 74. The top wall 75 of the hood 74 curves downwardly at its rear end portion to provide a rear wall 80 formed at its lower edge to provide a hinge journal 81. A hinge pin 82 is mounted in the hinge journal 81 and supports a pair of downwardly projecting flaps 83 to which are bolted or otherwise rigidly secured a pair of resilient extension elements 84 which together extend across the entire width of the hood 74 and are normally disposed closely adjacent the ground. A plurality of torsion springs 85 are mounted on and anchored to a pair of mounting rods 86 that extend transversely of the hood 74 adjacent the rear wall portion 80 thereof, said torsion springs 85 yieldingly urging the flaps 83 and extension elements 84 in a forward direction of swinging movement thereof. The outer ends of the rods 86 are rigidly anchored in mounting flanges or the like 87 extending rearwardly from the opposite side walls 73 of the hood 74 by means of anchoring pins or the like 88 which extend through selected ones of a plurality of circumferentially spaced apertures 89 in the mounting flanges 87 and apertures in the rod 86 aligned therewith. Forward swinging movement of the flaps 83 and extension elements 84 is limited by a plurality of stop lugs or the like 90 that are rigidly secured to the inner surface of the rear wall 80 and which extend downwardly beyond the level of the hinge pintle 82. Obviously, during forward movement of the machine, should the raking and sweeping device 2 pass over an anchored object, such as a large stone embedded in the ground, the flaps 83 and extension elements 84 will swing rearwardly about the axis of the hinge pintle 82 and against bias of the torsion springs 85 to prevent damage from being done to the hood 74.

As shown particularly in FIG. 5, the rear end portion of the hood 74 has an open bottom on which the rotor 70 works, and forwardly of the rotor 70, the hood 74 is provided with a bottom wall 91 that extends to the rear edge of the perforate trough 51. Further, the interior of the hood 74 is provided with a pair of forwardly diverging guide partitions 92 which extend generally vertically between the top wall 75 and the bottom wall 91, for the purpose of guiding material forwardly to opposite conveyor screw sections 44 and 45 at opposite sides of the blower housing 52.

For raising the raking and sweeping device 2 out of operative engagement with the ground, for the purpose of transport between areas of operation, I provide elevating mechanism including a horizontally disposed transverse elevating shaft 93 that is journalled in bearings 94 secured to opposite end portions of the front cross frame member 7, a pair of pulleys 95 rigidly mounted to opposite ends of the shaft 93, and lifting cables 96 anchored at one end to the pulleys 95 and at their opposite ends to the flanges 87, by means of links or the like 97. As shown in FIGS. 1 and 5, the cables 96 are entrained over the pulleys 98 that are suitably journalled in brackets 99 depending from the frame rails 5 and 6 above the rear end portion of the raking and sweeping device 2, the cables 96 between their respective pulleys 95 and 98 being looped as indicated at 100, and tension springs 101 are interposed therein to floatingly support the rear end portion of the hood 74 and the raking and sweeping device 2 carried thereby. Means for rotating the shaft 93 to raise or lower the raking and sweeping device 2 comprises a lever 102 suitably pivotally mounted to the frame rail 5 and a flexible cable 102a connected at one end to the lever 102 and at its opposite end to a pulley 103 rigidly mounted on the shaft 93.

As shown in FIG. 3, the rotor 70 comprises a pair of rotor sections in axially end-to-end relationship, each rotor section comprising a plurality of opposed pairs of axially spaced clamping brackets 104, each bracket 104 having a central arcuate portion 105 which partially encompasses the shaft 71, and generally radially outwardly projecting flanges 106. With reference to FIG. 5, it will be seen that the brackets 104 of each pair thereof engage diametrically opposite portions of the shaft 71, the flanges 106 of one of the brackets 104 being disposed in spaced parallel relationship to the flanges 106 of the opposite bracket 104. Nut-equipped clamping bolts or the like 107 extend through suitable apertures in the outer end portions of the flanges 106 and through cooperating pairs of opposed axially extending clamping bars 108 which dispose the several pairs of clamping brackets 104 in predetermined axially spaced relationship. Welded or otherwise rigidly secured to the arcuate portions 105 of the several clamping brackets 104 are bearing elements 109 for the reception of elongated nut-equipped mounting shafts or bolts 110 disposed in spaced parallel relationship at diametrically opposite sides of the shaft 71. A plurality of flat cutter blades 111 are journalled at their inner ends on the shafts 110 in axially spaced relationship, the blades 11 being maintained in axially spaced relationship by tubular spacers 112. The arrangement is such, that the cutter blades 111 at one side of each rotor section are axially offset or staggered with respect to the cutter blades 111 on the diametrically opposite side of the same rotor section, as shown in FIGS. 3 and 10. The cutter blades 111 are provided with sharp leading edges 113 and are free to rotate on their respective shafts 110, the blades extending radially outwardly from the axis of the shaft 71 during rotation of the rotor 70, due to centrifugal action.

Releasably clamped between the flanges 106 of opposite clamping brackets 104 and clamping bars 108, are radially outwardly projecting whiplashes 114 comprising finger-like whiplash elements or brush elements 115 and radially inner base portions 116. Preferably, and as shown in FIG. 5, the whiplashes 114 are made up of two or more thicknesses of rubber-like material whereby to provide a laminated structure, the laminations being clamped together between the bars 108. While the whiplashes may be made from any flexible material, I have found that very satisfactory results have been obtained by die cutting the whiplashes from commercially-available rubber belting which is made from rubber-impregnated fabric. With reference to FIG. 7, it will be seen that a pair of whiplashes A and B may be cut from a length of material with substantially no waste, the whiplash elements 115 of the whiplash A fitting the spaces between the whiplash elements 115 of the whiplash B. In assembling the rotor 70, the whiplashes B of a given rotor section are placed in axially end-to-end relationship as are the whiplashes A. Further, the base portions 116 of the several whiplashes are provided with radially extending slots 117 through which the clamping screws 107 extend, which slots permit radial adjustment of the whiplashes relative to the shaft 71. With the whiplashes clamped in the rotor 70, the leading whiplash elements 115, relative to the direction of rotation of the rotor 70, are disposed in face-to-face engagement with a trailing whiplash element or lamination thereof. By utilizing a laminated structure, the whiplashes 114 may be removed when the leading faces of the leading whiplash elements are worn, and the leading whiplashes inverted so that the worn face thereof is in face-to-face engagement with a trailing one of the whiplash elements; or if desired, the trailing laminations can be interchanged for the leading ones thereof to provide a new leading face for each of the whiplash elements. Further, by using such a laminated structure, one or more trailing whiplash elements aid in supporting the leading elements or lamination without imparting undue rigidity to the whiplash structure. By using the whiplashes A at one side of a rotor section and the whiplashes B at the diametrically opposite side thereof, the whiplash elements 115 of the whiplashes A will be disposed in axially displaced or staggered relationship with respect to the whiplash elements 115 of the whiplashes B. Preferably, the rotor 70 is divided into two sections as indicated generally at C and D in FIG. 3, the whiplashes and cutter blades of the rotor section C being angularly displaced with respect to the whiplashes and cutter blades of the section D to the extent that the rows of whiplashes 114 of the rotor section C are substantially aligned with the rows of cutter blades 111 of the rotor section D. It will be further noted that, with the above described arrangement, the rows of whiplashes in each rotor section are disposed substantially at right angles with respect to the rows of cutter blades in the same rotor section.

For the purpose of limiting downward movement of the raking and sweeping device 2, whereby to prevent the cutter blades 111 and whiplashes 114 from cutting or digging into the sod, I provide a pair of elongated skid elements 118, one each disposed adjacent a different side wall 73 of the hood 74. The skid elements 118 are preferably made from steel rod stock or the like, and have their opposite ends extending through and secured in mounting heads 119, by means of set screws 120, the heads 119 being secured to the side walls 73 by nut-equipped mounting screws 121. The set screws 120 permit adjustment of the skid elements 118 relative to the rotor 70, so that proper working elevation of the rotor 70 may be maintained.

Means for imparting rotation to the rotor 70 in a counterclockwise direction with respect to FIGS. 1 and 5, comprises an endless flexible drive belt 122 that is entrained over a pulley 123 mounted fast on the conveyor shaft 46 adjacent the pulley 68, and a second pulley 124 mounted fast on the adjacent end of the rotor shaft 71. A conventional guard for the pulley 124 and belt 122 is shown by dotted lines in FIG. 1 and indicated by the numeral 125.

When the internal combustion engine 59 is set into operation, and the entire structure moved forwardly over a lawn, the outer end portions of the cutter blades 111 move rapidly through the grass to rake the same, the sharpened leading edges 113 of the cutter blades 111 chopping the generally horizontally disposed portions of thatch-forming dead grass clippings and foreign material in the grass, and the whiplashes 114 sweeping the chopped material upwardly and forwardly through the hood 74 to the screw conveyors 45, which feed the material toward the blower housing 52, from whence the fan element 56 throws the material upwardly through the conduit 57 into the container 4. Obviously, the whiplashes 114 will pick up leaves, loose small stones and other debris which may be present on the lawn, and throw the same forwardly toward the conveyor screws 44 and 45. Usually, when the grass clippings and leaves are in a dry condition, the action of the cutter blades and whiplashes thereon will tend to break the material into pieces sufficiently small to pass through the perforations in the troughs 51 and be redeposited on the ground in the form of mulch, these pieces being normally of such small size as to avoid being again picked up by the raking and sweeping device.

When it is desired that all of the material picked up by the raking and sweeping device be deposited in the container 4, I provide a pair of semicylindrical trough liners or shields 126, see FIG. 9, which may be inserted into the trough 51 to prevent material from dropping through the perforations therein. FIG. 3 of the drawing shows the trough 51 with the liners or shields 126 removed, and FIGS. 5 and 6 show one of the troughs in place, the same held against movement by nut-equipped screws or the like 127 extending through suitable apertures in the liners 126 and through perforations in the troughs 51. When the container is filled with material, the lever 102 is manipulated to raise the raking and sweeping device 2 to an inoperative position above ground level, the entire device moved to a suitable place of deposit, the slide lock 29 unlatched to permit opening of the gate 27, and the winch 33 operated to tilt the container 4 to its dotted line position of FIG. 2, thus permitting the material to be dumped to one side of the machine. The gate 27 will open by gravity action during tilting movement of the container 4. However, if desired, the gate 27 may be manually opened prior to tilting the container 4 and held open by the rod 30.

The modified form of my invention shown in FIGS. 11-14 differs from the embodiment thereof illustrated in FIGS. 1-10, in that the form of FIGS. 11-14 involves a pair of raking and sweeping rotors in substantially axially end-to-end relationship. These rotors are journalled one each in a different one of a pair of hoods or housings 128 and 129, the rotors being identical, and only one thereof being shown, the same being indicated generally at 130. In this form of the invention, the main frame, ground-engaging wheels, screw conveyors and blower, and other parts not shown, are identical to the corresponding parts shown in FIGS. 1-10, those parts illustrated in FIGS. 11-14 being identified with numerals corresponding to the same parts illustrated in FIGS. 1-10, but with prime marks added. Likewise, the cutter blades and whiplashes, together with the mounting means therefor are identical to those of FIGS. 1-10, the several parts thereof being identified by the same reference characters as the corresponding parts of FIGS. 1-10, with prime marks added. In the modification, each of the rotors 130 includes a different one of a pair of generally axially aligned horizontal shafts 131 that are journalled in bearings 132 at opposite sides of their respective hoods 128 and 129, each of the shafts 131 being driven independently from the conveyor shaft 46' by a pair of drive belts 133 each disposed at an opposite side of the frame 1. With reference to FIG. 11, it will be seen that the drive belts 133 are entrained over drive pulleys 134 at opposite end portions of the conveyor shaft 46' and driven pulleys 135 one each rigidly mounted on the outer end of a different one of the rotor shafts 131.

The hoods 128 and 129 are pivotally secured at their front ends for generally vertical swinging movements in the same manner as the hood 74; and, while both hoods 128 and 129 are raised and lowered in common, the same are capable of independent raising and lowering movements. In the modified arrangement, a horizontally disposed transverse shaft 136 is journalled at its opposite ends in brackets 99' depending from the side frame rails 5' and 6', and is provided at its opposite end portions with pulleys 137 rigidly mounted thereon. Flexible cables 138 are anchored at their rear ends to the pulleys 137 and may be assumed to have their opposite ends anchored to other pulleys not shown, but corresponding to the pulleys 95. Also fixed to the shaft 136, each overlying the longitudinally central portion of a different one of the hoods 128 and 129, are lifting pulleys 139 to which are anchored the upper ends of generally vertically disposed cables 140 which have their lower ends tied to anchoring pins 141 that are mounted in bracket members 142 welded or otherwise rigidly secured to the rear top portions of the hoods 128 and 129. The flexible cables 140 are moved in common with rotation of the shaft 136, but permit the housings 128 and 129 to raise independently, should either thereof encounter an obstacle that is too heavy to be swept up by the raking and sweeping means.

My invention has been thoroughly tested and found to be completely satisfactory for the accomplishment of the objectives set forth; and, while I have shown and described a preferred embodiment of my rotary lawn tool, and a single modification thereof, it will be understood that the same is capable of further modification without departure from the spirit and scope of the invention, as defined in the claims.

What I claim is:

1. In a mobile rotary lawn tool, rotary shaft means, means journalling said shaft means for rotation on a horizontal axis extending transversely of the direction of travel of the tool, circumferentially spaced axially extended rows of axially spaced radial blades pivotally mounted on said shaft means, said blades being adapted to pass between upstanding blades of live grass to rake the grass and to chop generally horizontally disposed portions of thatch-forming dead grass clippings and foreign material in the grass, circumferentially spaced axially extended rows of flexible radial brush elements fixedly mounted on said shaft means circumferentially between said rows of cutter blades, said brush elements extending radially from the shaft means a distance substantially equal to said blades to engage and sweep said chopped material, and means for imparting rotation to said shaft means.

2. In a mobile rotary lawn tool, a rotary shaft, means journalling said shaft for rotation on a horizontal axis extending transversely of the direction of travel of the tool, a pair of diametrically opposed axially extended rows of axially spaced radial cutter blades mounted on said shaft, said cutter blades having sharp leading edge portions adapted to pass between upstanding blades of live grass to rake the grass and to chop generally horizontally disposed portions of thatch-forming dead grass clippings and foreign material in the grass, the cutter blades of one of said rows thereof being axially offset with respect to the blades of the opposite row thereof, a pair of diametrically opposed axially extended rows of axially spaced flexible radial whiplashes mounted on said shaft circumferentially between said rows of cutter blades, said rows of whiplashes being substantially normal to the rows of said cutter blades, said whiplashes extending radially from the shaft a sufficient distance to follow the end portions of said cutter blades to assure sweeping engagement of the whiplashes with the chopped material, the whiplashes of one of said rows thereof being axially offset with respect to the whiplashes of the opposite row thereof, and means for imparting rotation to said shaft.

3. In a mobile rotary lawn tool, a rotary shaft, means journalling said shaft for rotation on a horizontal axis extending transversely of the direction of travel of the tool, diametrically opposed clamping brackets having arcuate intermediate portions engaging diametrically opposite portions of said shaft and each having aligned generally radially extending clamping flanges, the clamping flanges of one of said clamping brackets being generally parallel to the clamping flanges of an opposite clamping bracket, a pair of diametrically opposed axially extended rows of axially spaced radial cutter blades, means mounting said rows of cutter blades each to the arcuate portion of an opposite one of said clamping brackets, said cutter blades having sharp leading edges adapted to pass between upstanding blades of live grass to rake the grass and to chop generally horizontally disposed portions of thatch-forming dead grass clippings and foreign material in the grass, a pair of diametrically opposed axially extended rows of axially spaced flexible whiplashes, each row of said whiplashes being clamped at their inner end portions between opposed ones of said clamping flanges, said whiplashes and cutter blades extending radially from the shaft substantially equal distances to assure sweeping engagement of the whiplashes with the chopped material, and means for imparting rotation to said shaft.

4. In a mobile lawn tool having a rotary shaft disposed transversely of the direction of travel of the tool, power means on the tool for rotating the shaft, a plurality of rigid cutter blades pivoted to the shaft on axes parallel to the shaft axis to effect a cutting action upon the ground surface as the tool is moved thereover, and a plurality of flexible whiplash members fixed to the shaft to extend radially therefrom into the path of movement of said cutter blades, and said cutter blades and whiplash members being arranged in circumferentially spaced axial rows whereby the ground surface traversed by the tool will be alternately subjected to cutting action by the blades and brushing action by the whiplashes.

5. The subject matter of claim 4 wherein the fixation of the whiplash members to the shaft includes means for adjusting the radial extension of said members.

References Cited in the file of this patent

UNITED STATES PATENTS

| | | |
|---|---|---|
| 112,837 | Norris | Mar. 21, 1871 |
| 2,501,925 | Yensen et al. | Mar. 28, 1950 |
| 2,505,576 | Reitain | Apr. 25, 1950 |
| 2,506,054 | Agee et al. | May 2, 1950 |
| 2,525,090 | Bott | Oct. 10, 1950 |
| 2,700,863 | Etem | Feb. 1, 1955 |
| 2,806,341 | Bowie | Sept. 17, 1957 |
| 2,829,485 | Hofer | Apr. 8, 1958 |